United States Patent [19]

Finnern

[11] Patent Number: 4,958,927

[45] Date of Patent: Sep. 25, 1990

[54] OPTICAL ANGLE MEASURING INSTRUMENT

[75] Inventor: Gerd Finnern, Hamburg, Fed. Rep. of Germany

[73] Assignee: C. Plath Fabrik nautischer Instrumente, Del.X

[21] Appl. No.: 299,873

[22] Filed: Jan. 23, 1989

[30] Foreign Application Priority Data

Jan. 20, 1988 [DE] Fed. Rep. of Germany ....... 3801553

[51] Int. Cl.$^5$ ..................... G01B 11/26; G01C 1/08
[52] U.S. Cl. ...................................... 356/140; 33/282
[58] Field of Search ............... 33/282, 276, 277, 278, 33/283, 284; 356/140, 144, 253, 255

[56] References Cited

U.S. PATENT DOCUMENTS 2,439,102  4/1948  Rothweiler ........................... 33/282
3,968,570  7/1986  Leuchter, Jr. ....................... 356/140

*Primary Examiner*—F. L. Evans
*Assistant Examiner*—Karen Paulette Hantis
*Attorney, Agent, or Firm*—Elliott N. Kramsky

[57] ABSTRACT

A manually-rotatable switch knob is provided on the alhidade of a sextant that is connected to a switching pin of hardened steel arranged eccentrically to the mounting of the knob. The switching pin engages the drum-screw mounting and, under the action of a stop spring, permits the drum screw to be switched back and forth between two stable stop locations when the knob is rotated. In the one stop location, the drum screw engages the limbus toothing. In the other location, the drum screw is completely disengaged from the limbus toothing so that the alhidade can be freely pivoted without risk of the drum screw damaging the limbus toothing during the movement of the alhidade. The stop spring also produces precisely defined contact pressure between the drum screw and the limbus toothing. The previously possible introduction of bending moments into the alhidade during rough adjustment is eliminated.

8 Claims, 1 Drawing Sheet

OPTICAL ANGLE MEASURING INSTRUMENT

BACKGROUND

1. Field of the Invention

The present invention relates to optical angle measuring instruments. More particularly, this invention pertains to an improved sextant.

2. Description of the Prior Art

The rough setting of the alhidade along the arc of the limbus toothing requires disengagement of the drum screw (connected to the measuring drum) from the limbus. In the prior art, the drum screw bearing articulated at the lower free end of the alhidade is disengaged by a spring-biased catch and pivoted so that the drum screw is disengaged from the limbus toothing. The disengaging member and the catch are relatively far removed from the limbus toothing and the engagement region of the drum screw. As a consequence, a bending moment can act on the alhidade if the actuation force acting on the catch does not act in at least an approximately tangential direction with respect to the limbus arc. As a result, indirectly caused measuring errors may occur. Additional measuring errors or inaccuracies can arise as a result of the fact that the point of engagement of the (normally conical) drum screw is slightly displaced by unavoidable production tolerances of the alhidade toothing. The moment of contact pressure, which acts, for example, through a bent leaf spring in the measuring drum bearing onto the end of the drum screw remote from the region of engagement may change when the catch is (unknowingly) slightly pressed by the user. A 0.1 mm diameter offset in the radial direction in the region of engagement of the conical drum screw can alter the lead angle by about 50" (sec).

A further problem that occurs in practice which gradually worsens the measuring quality of angle-measuring instruments of the above-mentioned type arises from the situation in which the catch by which the drum screw is pivoted to come free from the limbus toothing is not completely pressed. In such a case the user begins the rough adjustment by pivoting the alhidade before the drum screw is completely out of engagement with the limbus toothing causing the drum screw to "chatter" along the limbus toothing. As a result, the measuring accuracy of the instrument worsens and such inaccuracy inevitably has to be accepted over time even when hardened materials are used for the drum screw and the limbus toothing. Taking into account the usual geometry of the graduated arc or limbus, an alteration resulting from improper handling of only 1/1000 mm will degrade measuring accuracy by 2.5 arc seconds.

SUMMARY AND OBJECTS OF THE INVENTION

It is therefore an object of the present invention to improve the pivotal bearing of the measuring drum with drum screw to substantially avoid the possible imposition of bending moments on the alhidade during rough adjustment of the alhidade.

Another object of the present invention is to achieve the aforesaid object while completely avoiding the risk of an incomplete separation between the drum screw and the limbus toothing.

The foregoing and other objects and advantages of the present invention are achieved by the present invention which provides an improvement in an optical angle measuring instrument of the type that includes an alhidade having a free end that is pivotally mounted on a limbus, a measuring drum that is pivotally articulated on the free end of the alhidade perpendicularly to the axis of the alhidade bearing and having a drum screw engaged to a limbus toothing. Such improvement includes a manually rotatable switching member. Such member is mounted on an alhidade and rigidly connected to a switching pin that passes through a slot in an alhidade plate. That pin is located eccentrically with respect to a switching member mount and is arranged to allow the drum screw, under the action of a stop element, to be switched back and forth between two stable stop locations in response to rotation of the switching member. The drum screw is arranged to engage the limbus toothing in one stop location and to disengage the limbus toothing in the other location, thereby permitting the alhidade to pivot freely.

The preceding and other features of the invention will become further apparent from the detailed description that follows. Such description is accompanied by a set of drawing figures that include numerals, corresponding to those of the written description, which point to the features of this invention. Like numerals refer to like features of the invention throughout both the drawings and the written specification.

DETAILED DESCRIPTION

Figure 1:
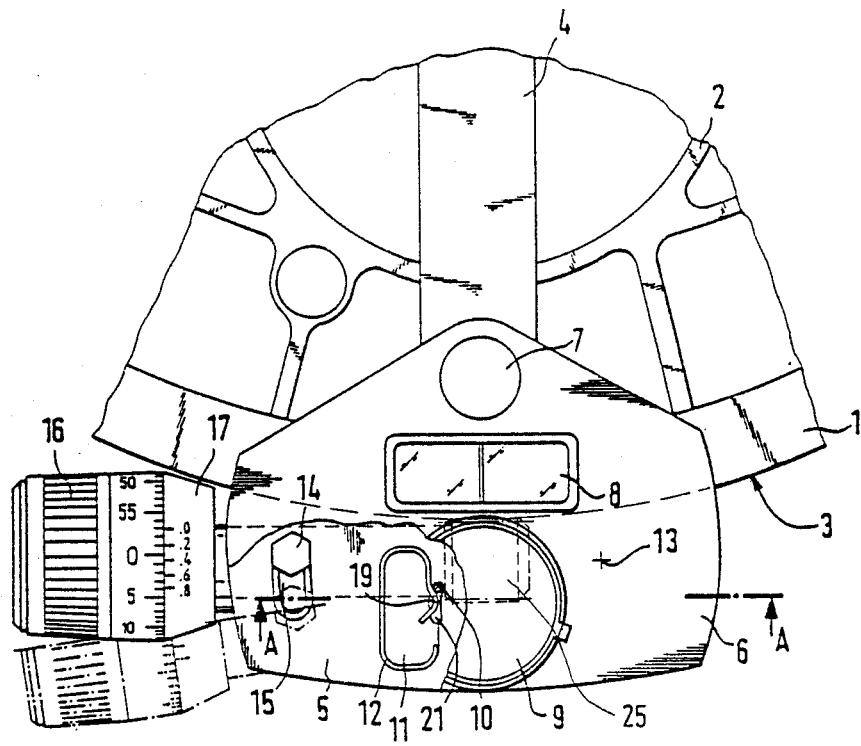
FIG. 1 is a partial sectional view of a sextant for illustrating the two possible stop locations of a drum screw.

FIG. 1 is a partial sectional view of a sextant in accordance with the present invention. The partial sectional representation illustrates a limbus 1 with limbus body 2 and alhidade 4. A cover cap 6 that includes a read-off window 8 is fitted to the lower free end of the alhidade 4 by a fastening means 7. (The read-off scale of the limbus 1 is not shown.) The limbus toothing 3 that is provided at its lower outer graduated arc is clearly shown in FIG. 2, (a partial sectional view of the sextant taken along the line A—A of FIG. 1.)

The alhidade 4 provides both the mounting and bearing for a measuring drum 16 that includes a vernier scale 17. The measuring drum 16 is directly connected to a drum screw 25. The drum 16 along with the drum screw 25 is held by means of a drum-screw bearing plate 18 that is pivotally fastened to an alhidade plate 5 as explained in further detail below.

A knob 9 is provided as a switching member for the engaged adjustment of the drum screw 25 that is rotatably mounted to the alhidade 4 (bearing 20), its axis lying on the longitudinal axis of the alhidade 4. A switching pin 10 (e.g. of hardened steel) is fitted into the knob 9 eccentrically with respect to its axis 22. The pin 10 runs parallel to the axis 22, fixed thereto by adhesion, screwing, press-fitting or the like. It passes through the wall of the cover cap 6 and through a bent-shaped slot 21 in the alhidade plate 5 to engage a milled relief (slot), with its free end adapted to the diameter of the switching pin 10, in the drum-screw bearing plate 18. One end of a bow spring 12, provided with a cam 19 by bending and fitted into a corresponding clearance 11 in the alhidade plate 5 acts on the switching pin 10. As can be seen clearly in FIG. 1, the spring 12 tends to displace the switching pin 10 to the right. Two "stop" positions are defined for the stop pin 10 due to the dimensions of the slot 21 and the positioning of the cam 19 on the bow spring 12. One of such positions lies above while the other lies below the line of intersection A—A in FIG. 1 and thus respectively above and below the center of the switch knob 9.

Figure 2:
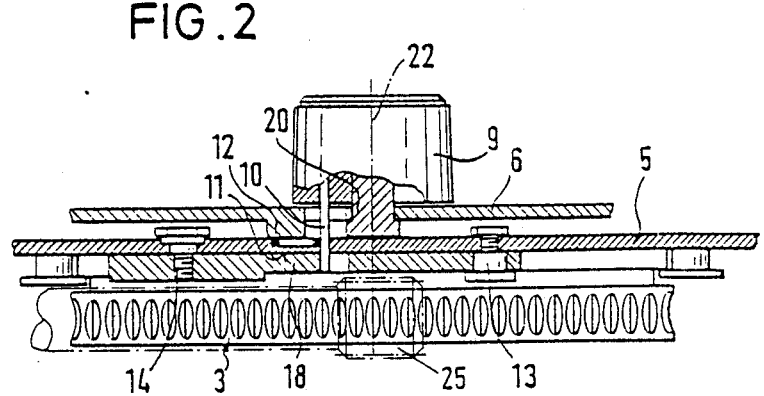
FIG. 2 is a partial sectional view of the sextant taken along the line A—A of FIG. 1.

The measuring drum 16 with drum screw and drum screw bearing plate 18 are fixed to one side of the alhidade or alhidade plate 5 by a bearing screw 13 (side furthest remote from the measuring drum 16) and to the other side by a retaining screw 14 that can be pivoted in a slot 15 in the alhidade plate 5 through a fixed angular range together with the drum-screw bearing plate 18 and the measuring drum 16 with drum screw 25. The bearing screw 13 is, as can be seen in FIG. 2, threadedly engaged to the alhidade plate 5 and has a sliding bearing head in the region of the opening in the drum-screw bearing plate 18. As a result, the drum-screw bearing plate 18 can be pivoted in a vertical direction with the stationary bearing screw 13 relative to the alhidade plate 5 as shown in FIG. 2. Such pivoting movement is limited on the other side by the slot 15 that is passed through by the fixing screw 14 which is screwed into the drum-screw bearing plate 18. As mentioned, the switching pin 10 engages a bore hole in the drum-screw bearing plate 18 so that, in combination, the screws 13, 14 and the switching pin 10 provide a three-point bearing for the drum screw 25.

When the switch knob 9 is turned to the left from the upper stop location shown in FIG. 1, the switching pin 10 presses onto the cam 19 of the bow spring 12, deflecting it slightly to the left. The switching pin 10 then slides past the switching cam 19, taking the drum-screw bearing plate 18 with it and then slides into engagement at the second possible lower stop location shown in broken lines in FIG. 1. In this pivoting movement, the drum-screw bearing plate rotates about the bearing of the screw 13, while the head of the screw 14 slides in the slot 15 and moves into the lower stop location. In such a position the drum screw 25 is now disengaged making rough adjustment of the alhidade possible without problem. (The position of the measuring drum 16 with drum screw drawn in solid lines corresponds of course to the engaged position of the drum screw 25).

Since the bow spring 12 with cam 19 allows only two defined stop positions for the switching pin 10 and intermediate positions are not possible, the drum screw 25 is either in secure engagement with the limbus toothing 3 ("fine adjustment by means of drum screw 16" position) or in the disengaged position, that is completely outside contact engagement with the limbus toothing 3 ("rough adjustment of the alhidade" position).

At the same time the bow spring 12 produces the contact pressure of the drum screw 25 into the limbus toothing 3 via the switching pin 10. This contact-pressure force can be determined very precisely to ensure a reproducible measuring accuracy.

The switching member is preferably realized as a rotatable switch knob which is mounted on the alhidade above the cover cap and can be turned back and forth between two defined stop locations. Due to the special design of a bow-shaped stop spring that includes a rounded-off cam as stop element two possible stop locations are "enforced" while intermediate positions of the switch knob, and thus of the drum screw, are excluded. That is, in one stop location the drum screw is engaged to the limbus toothing under a contact pressure determined by the stop spring. In the other location, the drum screw is moved away from the limbus toothing to such an extent that slight pivoting of the alhidade is possible for rough adjustment. "Rattling along" or chattering of the drum screw on the limbus toothing is eliminated. Consequently, the hitherto-possible damaging of the toothing of the limbus graduated arc and/or the drum screw due to early closure of the disengagement are also eliminated.

Other design features further ensure two stable end locations of the switch knob (and, thus, of the drum-screw position) including, for example spring-biased cam disks, toggle-lever joints, torsion springs with catches and the like.

In the case of a preferred embodiment of the invention, the switch knob is positioned on the alhidade so that the stop spring acts on the preferably-hardened switching pin directly above or below the drum-screw bearing. As a result, a stable three-point position is provided for the drum-screw mounting. Due to such an arrangement of the bearing points, the hitherto-possible, unknowing introduction of bending moments onto the alhidade as a consequence of disengagement members lying way outside is avoided.

A further advantage of the invention arises from the fact that the stop spring produces a precisely defined contact-pressure force of the drum screw against and into the graduated arc of the limbus toothing. The formerly-received separate contact-pressure spring may be dispensed with, providing a further reduction of bending moments on the drum screw or its mount.

The precisely-defined point of engagement of the drum screw into the limbus toothing and an increase in the accuracy of the measured result are achieved by replacement of the usual conical drum screw with a cylindrical drum screw. The uniform diameter of that drum screw avoids the measurement errors that can occur as a result of the positional tolerances of a conical screw.

Thus it is seen that the present invention improves the pivotal bearing of a measuring drum with drum screw so that possible bending moments on the alhidade during rough adjustment are substantially avoided and the risk of incomplete separation between the drum screw and the limbus toothing is eliminated.

While this invention has been described with reference to its presently preferred embodiment, it is not limited thereto. Rather, the scope of the invention is limited only insofar as defined by the following set of claims and includes all equivalents thereof.

What is claimed is:

1. In an optical angle measuring instrument of the type that includes an alhidade that is pivotally mounted on a limbus and has a free end, a measuring drum that is pivotally articulated on the free end of the alhidade perpendicularly to the axis of an alhidade bearing and having a drum screw engaged to a limbus toothing, the improvement comprising:
   (a) a manually rotatable switching member;
   (b) said member being mounted on said alhidade and rigidly connected to a switching pin passing through a slot in an alhidade plate;
   (c) said pin being located eccentrically with respect to a switching member mount;
   (d) said pin being so located that said drum screw, under the action of a stop element, is switchable between two stable stop locations in response to rotation of said switching member; and (e) said drum screw being arranged to engage said limbus toothing in one stop location and to disengage said limbus toothing in said other location to permit said alhidade to pivot freely.

2. An angle measuring instrument as defined in claim 1 further characterized in that:

(a) said switch member is a switching knob on said alhidade; and (b) said stop element is a stop spring.

3. An angle measuring instrument as defined in claim 2 further characterized in that:

(a) said stop spring abuts said switching pin in a contact region;

(b) said stop spring is a wire-bow spring having a stop cam in the contact region with said switching pin that is displaced against the action of said wire-bow spring by said switching pin when said switching pin is rotated; and (c) said cam is so located as to lock said switching pin into one of two stop locations determined by the length and arrangement of a slot in said alhidade and said alhidade plate.

4. An angle measuring instrument as defined in claim 3 wherein said stop spring is fitted into an adapted clearance of said alhidade.

5. An angle measuring instrument as defined in claim 3 wherein said stop spring is fitted into said alhidade plate connected to said alhidade.

6. An angle measuring instrument as defined in claim 3 further characterized in that:

(a) a three-point bearing pivotally secures said measuring drum with drum screw;

(b) the bearing point most remote from said measuring drum is formed by a first pivot bearing;

(c) a second bearing point is formed by a displaceable bearing pin; and (d) a third bearing point is formed by said switching pin located outside the line joining said other bearing points.

7. An angle measuring instrument as defined in claim 6 wherein said three-point bearing is located on said alhidade.

8. An angle measuring instrument as defined in claim 6 wherein said three-point bearing is located on said alhidade plate.

* * * * *